(12) United States Patent
Khavronine

(10) Patent No.: US 8,109,419 B2
(45) Date of Patent: Feb. 7, 2012

(54) CRASH SHOCK ABSORBING DEVICE

(75) Inventor: Alexandre Khavronine, Afula (IL)

(73) Assignee: Mag-Eh Ltd., Hashofet (IL)

( * ) Notice: Subject to any disclaimer, the term of this patent is extended or adjusted under 35 U.S.C. 154(b) by 486 days.

(21) Appl. No.: 12/420,086

(22) Filed: Apr. 8, 2009

(65) Prior Publication Data
US 2009/0255964 A1 Oct. 15, 2009

(30) Foreign Application Priority Data

Apr. 10, 2008 (IL) .......................... 190772

(51) Int. Cl.
*B62D 43/02* (2006.01)
(52) U.S. Cl. ............... 224/42.23; 224/42.12; 224/42.21; 224/42.24; 224/538; 254/323; 414/463
(58) Field of Classification Search ............... 224/42.12, 224/42.13, 42.14, 42.15, 42.18, 42.19, 42.21, 224/42.23, 42.24, 42.25, 42.26, 42.28, 42.29, 224/42.3, 42.37, 538; 254/323; 414/463, 414/466; 267/136; 296/37.2
See application file for complete search history.

(56) References Cited

U.S. PATENT DOCUMENTS

| | | | | |
|---|---|---|---|---|
| 4,446,944 A * | 5/1984 | Forrest et al. | ..................... | 182/3 |
| 4,884,785 A * | 12/1989 | Denman et al. | ............... | 254/389 |
| 5,113,981 A * | 5/1992 | Lantz | ............................ | 188/371 |
| 5,975,498 A | 11/1999 | Sauner | | |
| 6,006,699 A * | 12/1999 | Keever | .......................... | 119/795 |
| 6,406,000 B1 | 6/2002 | Raz et al. | | |
| 6,435,479 B1 * | 8/2002 | Raz et al. | ...................... | 254/323 |
| 6,488,434 B1 * | 12/2002 | Graeff | ............................. | 403/2 |
| 7,650,717 B2 * | 1/2010 | Drayer | ........................... | 47/32.5 |
| 2006/0045689 A1* | 3/2006 | Voegeli et al. | ................ | 414/463 |

* cited by examiner

*Primary Examiner* — Justin Larson
*Assistant Examiner* — Steven M Landolfi, Jr.
(74) *Attorney, Agent, or Firm* — Bachman & LaPointe, P.C.

(57) ABSTRACT

A device for absorbing shocks of a liftable and lowerable object such as a spare tire includes a first hoisting cable having a hoist-side end and an object-side end and a hollow cylinder encompassing a folded or coiled length of the first hoisting cable near the object end inside the cylinder. Lower and upper ferrules at the lower and upper ends of the cylinder are held in position by a second auxiliary cable having two ends, each end attached to one of the ferrules, the second auxiliary cable having a smaller tearing strength than the first hoisting cable.

7 Claims, 4 Drawing Sheets

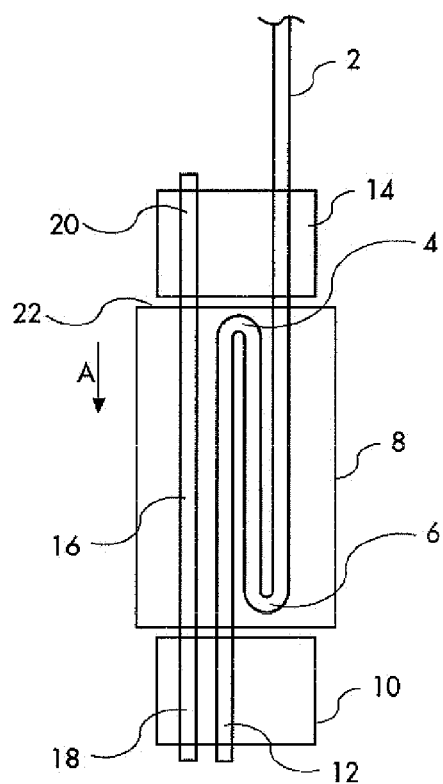 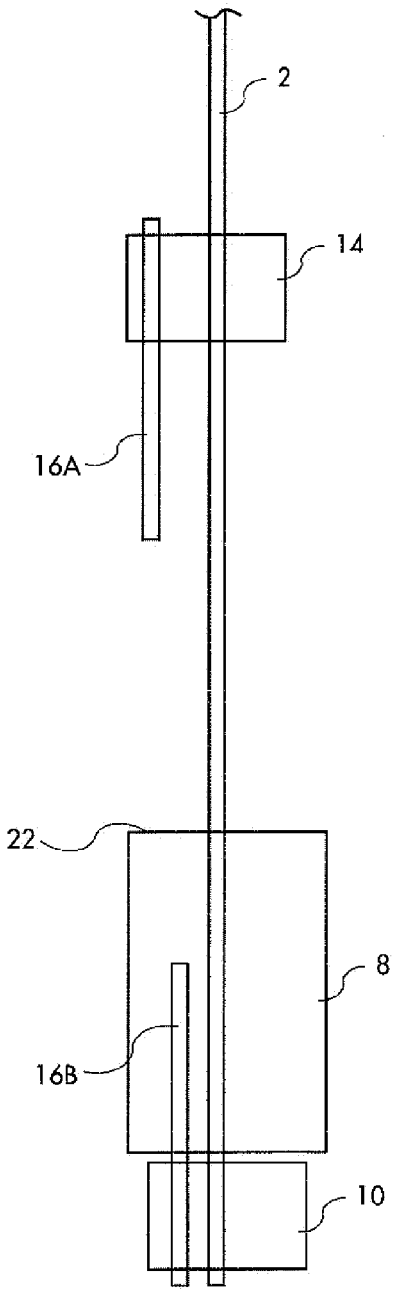
FIG. 1a
FIG. 1b

CRASH SHOCK ABSORBING DEVICE

FIELD OF THE INVENTION

The present invention relates to a device for securing a lowerable and liftable object, in particular, a spare tire for a vehicle against disconnection from the vehicle during or following accidents, crashes or severe shocks

BACKGROUND OF THE INVENTION

Spare tires for vehicles are mostly heavy and bulky objects that, in many vehicles, are accommodated below the vehicle body and are secured against the bottom of the vehicle or against a structure carried by elements of the vehicle chassis. Because of their weight and size, vehicle spare tires can rarely be lowered to the ground, nor raised for storage, by hand. For this reason, heavier vehicles are provided with hoisting devices such as winches, by means of which the spare tire is lowered or raised using a steel cable.

Steel cables, however, are liable to snap or break due to a number of causes, all of which are relevant to their use for the above-mentioned purpose: lack of maintenance, corrosion due to exposure to the environment, fatigue due to vibration-enhanced stresses, accidents, crashes, severe shocks, and the like. A hoisting cable failure could cause the spare tire to break loose from the vehicle and should this happen, it would seriously endanger other road users behind or alongside it.

A safety device to prevent such accidents is known from U.S. Pat. No. 5,975,498, which provides a device consisting of an additional short cable. In case of main cable failure, the additional cable prevents the tire from breaking loose. However, the device functions well only when the main cable breaks near the object end.

U.S. Pat. No. 6,406,000 in the name of the present assignee discloses a device for securing an upper terminal position of a liftable and lowerable object such a spare tire secured by a cable, wherein a lever and catch mechanism operate to prevent the tire from falling in the event of the cable snapping.

SUMMARY OF THE INVENTION

It is an object of the present invention to provide a device that, in case of an accident, will prevent the detachment of a load (e.g. spare tire) from the vehicle by absorbing the shock of the crash.

According to the present invention there is therefore provided a device for absorbing shocks of a liftable and lowerable object, comprising a first hoisting cable having a hoist-side end and an object-side end, a hollow cylinder encompassing a length of said first hoisting cable near the object-side end, said length being folded or coiled inside said cylinder, and a lower ferrule at the lower end of said cylinder and an upper ferrule at the upper end of said cylinder, said ferrules being held in position by a second auxiliary cable having two ends, each end attached to one of said ferrules, said auxiliary hoisting cable having a smaller tearing strength than the first hoisting cable.

The invention further provides a wheel retainer for supporting a spare tire from below, the retainer being located above said cylinder and being provided with an opening larger than the diameter of the cylinder; and a compression spring having a lower end that rests on the lower ferrule and an upper end on which said retainer rests.

BRIEF DESCRIPTION OF THE DRAWINGS

In order to understand the invention and to see how it may be carried out in practice, embodiments will now be described, by way of non-limiting example only, with reference to the accompanying drawings, in which:

FIG. 1a is a schematic description of the device according to the present invention, at normal state;

FIG. 1b is a schematic description of the device according to the present invention, at after-shock state;

Figure 2:
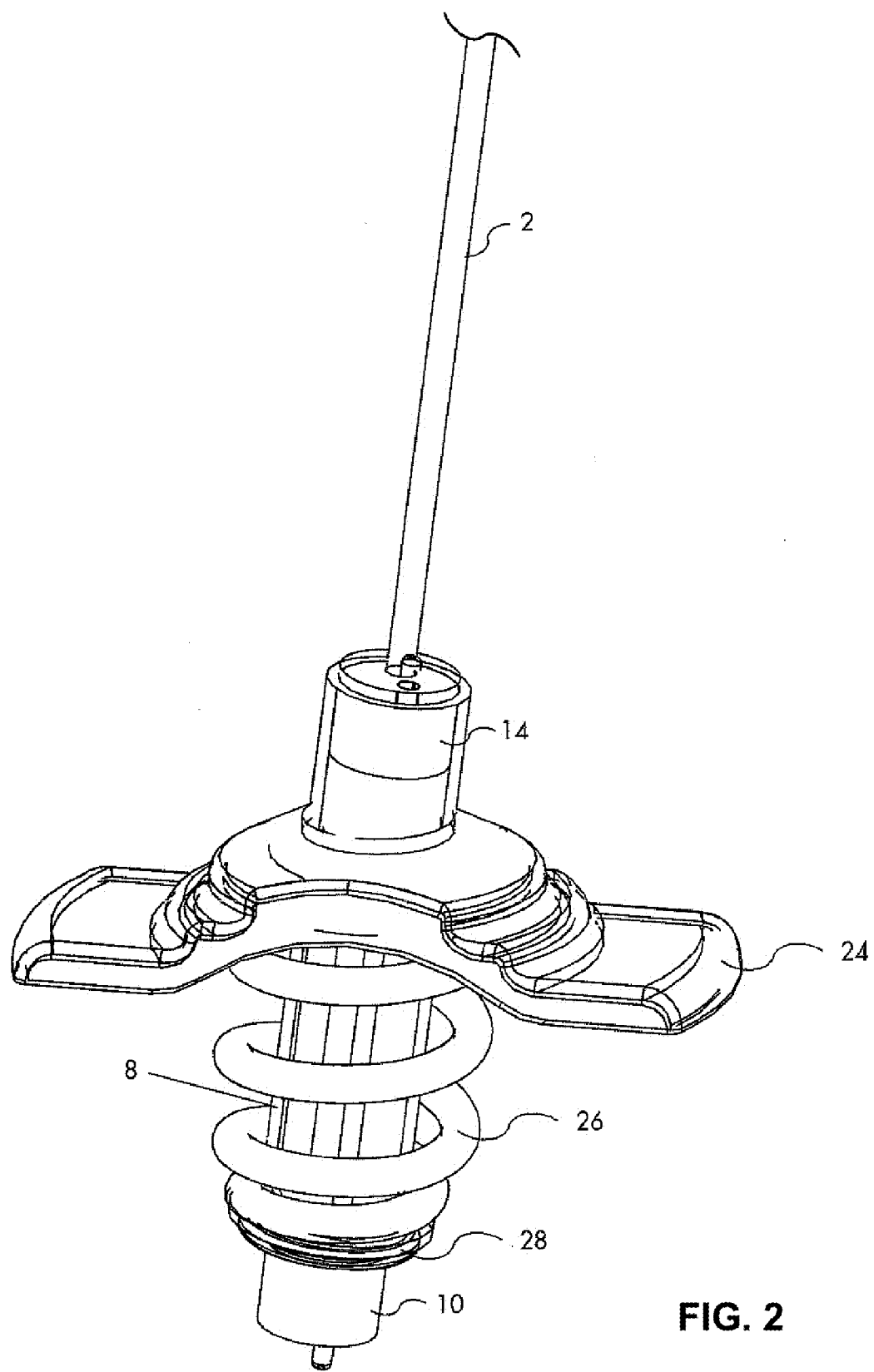
FIG. 2 is a perspective view of a preferred embodiment of the device according to the present invention, at normal state.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

DETAILED DESCRIPTION OF EMBODIMENTS

In the following description of some embodiments, identical components that appear in more than one figure or that share similar functionality will be referenced by identical reference symbols.

Referring now to the drawings, there is shown in FIG. 1a a schematic description of the device according to the present invention, at normal operation. A first cable 2 (constituting a hoisting cable) has a first folding 4 and a second folding 6 accommodated in a hollow cylinder 8. Cable 2 is tightly fastened in a lower ferrule 10 at the cable's object end 12 and in an upper ferrule 14 along its length above cylinder 8. A second short cable 16 (constituting an auxiliary cable) is also tightly fastened at its lower end 18 and at its upper end 20 in ferrules 10 and 14, respectively. Instead of folding the cable 2 inside ferrule 10, the cable may just as well be coiled therein.

In the event of a severe shock applied to the upper end 22 of the cylinder 8 by spare tire 23 (shown in FIG. 4), via wheel retainer 24 (FIG. 2), cylinder 8 pushes ferrule 10 in the direction of arrow A. Consequently, ferrule 10 pulls the auxiliary cable 16, which has a breaking or tearing strength of, for example, approximately 700 kg, that is lower than the tearing strength of cable 2 (e.g., approximately 1500 kg). Should the auxiliary cable 16 tear and split apart, the device will take the form described by the schematic drawing in FIG. 1b.

In FIG. 1b there is shown a schematic description of the device, according to the present invention, following a severe shock that caused cable 16 to tear and split into portions 16A and 16B. Since ferrules 10 and 14 no longer hold cable 2 folded, it becomes fully extended.

In FIG. 2 there is shown a perspective view of a preferred embodiment of the device, according to the present invention, at normal state. Wheel retainer 24 rests on compression spring 26, which rests on flange 28 firmly attached to the bottom of cylinder 8. In the event of severe shock, the spare tire (not shown) resting on wheel retainer 24 may accelerate and apply force onto wheel retainer 24, which compresses spring 26, and which in turn pushes ferrule 10 to pull cables 2 and 16.

Figure 3:
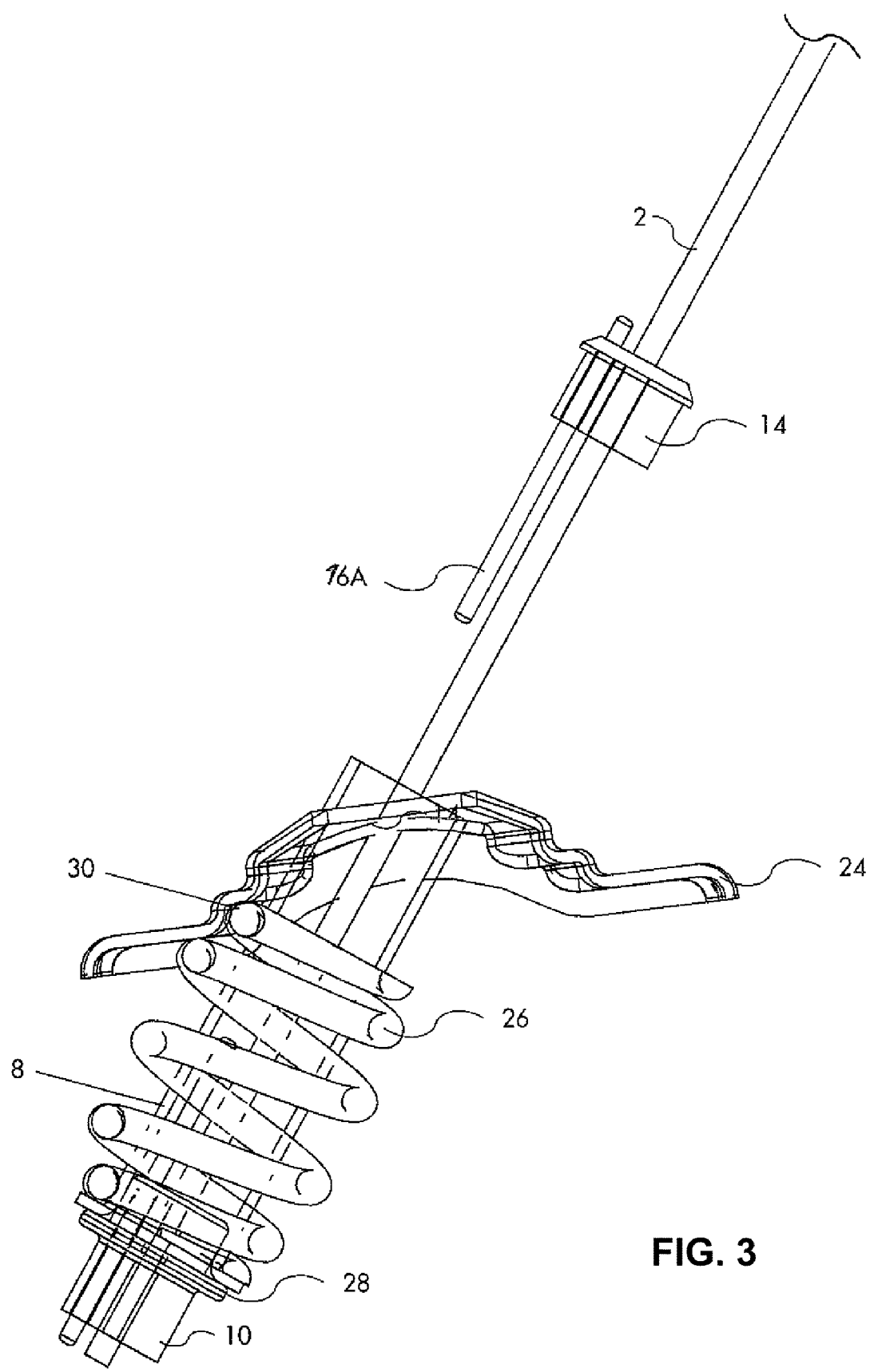
FIG. 3 is a perspective view of an embodiment of the device according to the present invention, at after-shock state.

In FIG. 3 there is shown a perspective view of a preferred embodiment of the device, according to the present invention, at after-shock state. Spare tire (not shown) that rests on wheel retainer 24 accelerates and applies force onto wheel retainer 24. Wheel retainer 24 pushes compression spring 26 at region 30, spring 26 pushes flange 28 of cylinder 8, which in turn, pushes ferrule 10, and which subsequently pulls cables 2 and 16, but tears only cable 16 to split it into portions 16A and 16B (FIG. 1b), since cable 16 has a smaller tearing strength. Consequently, a significant part of the shock's energy is absorbed by cable 16 when tearing into portions 16A and 16B.

In addition to cable 16, one or more further cables may be clamped to ferrules 10 and 14. These cables may be designed to constitute additional safety stages, should cable 16 tear during a crash, or otherwise. The combined tearing strength of the auxiliary cables is smaller than the tearing strength of the main hoisting cable 2.

Figure 4:
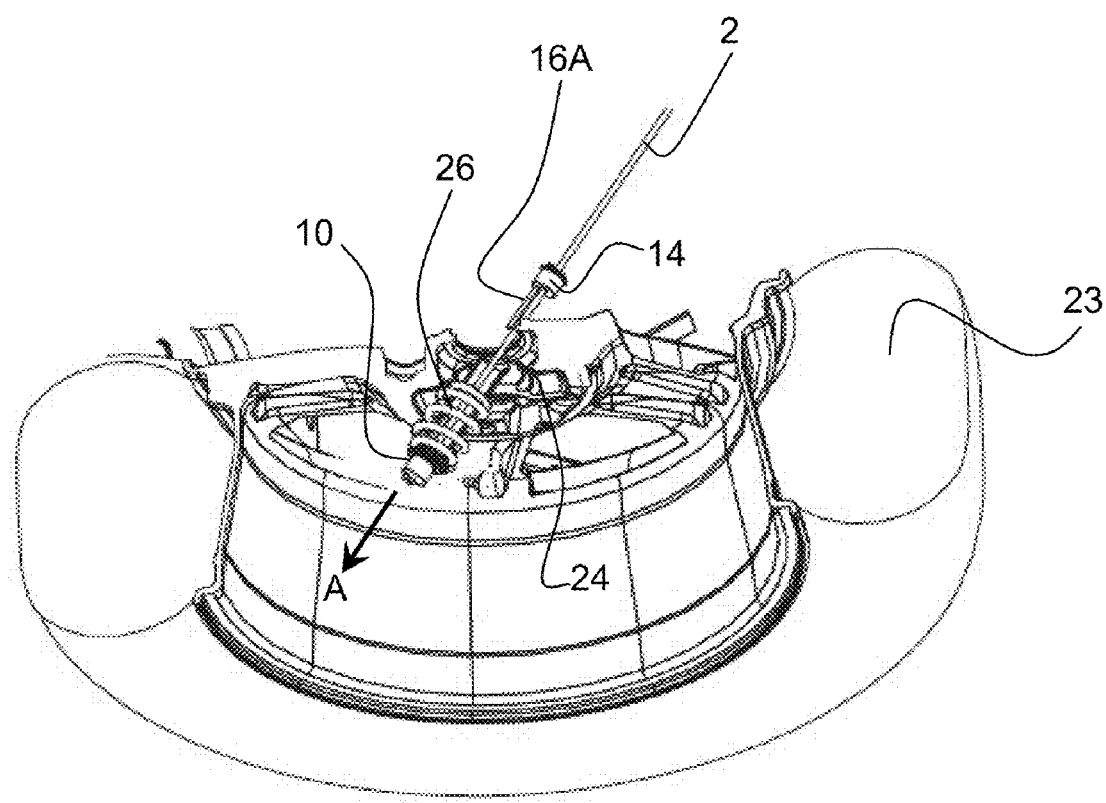
FIG. 4 is a partial sectional view of a detail of the device shown in FIG. 2 showing its use for preventing unintended dislocation of a spare tire.

FIG. 4 shows a detail of the wheel retainer 24 shown in FIG. 2 when attached to the tire. In the event of a shock, the cylinder 8 (shown in FIGS. 1a and 1b) pushes the ferrule 10 in the direction of arrow A. Consequently, the ferrule 10 pulls the auxiliary cable 16, which has a breaking or tearing strength of, for example, approximately 700 kg, that is lower than the tearing strength of the main hoisting cable 2 (e.g., approximately 1500 kg).

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. A device for absorbing shocks of a liftable and lowerable object, comprising;
   a first hoisting cable having a hoist-side end and an object-side end;
   a hollow cylinder encompassing a length of said first hoisting cable near the object-side end, said length being folded or coiled inside said cylinder; and
   a lower ferrule at the lower end of said cylinder and an upper ferrule at the upper end of said cylinder, said ferrules being held in position by a second auxiliary cable having two ends, each end attached to one of said ferrules, said second auxiliary cable having a smaller tearing strength than the first hoisting cable.

2. The device claimed in claim 1, wherein said liftable and lowerable object, is a spare tire.

3. The device claimed in claim 2, further comprising:
   a wheel retainer for supporting a spare tire from below, said wheel retainer being located above said cylinder; and
   a compression spring having a lower end that rests on said lower ferrule via a flange and an upper end on which said retainer rests.

4. The device claimed in claim 2, further comprising:
   a wheel retainer for supporting a spare tire from below, said retainer being located above said cylinder and being provided with an opening larger than the diameter of said cylinder; and
   a compression spring having a lower end resting on said lower ferrule and an upper end on which said retainer rests.

5. A device for preventing unintended dislocation of a spare vehicle tire, the device comprising;
   a hoisting cable having a hoist-side end and a tire-side end;
   a hollow cylinder encompassing a length of said hoisting cable near the tire-side end, said length being folded or coiled inside said cylinder; and
   a lower ferrule at the lower end of said cylinder and an upper ferrule at the upper end of said cylinder, said ferrules being held in position by at least one auxiliary cable having two ends, each end attached to one of said ferrules, said auxiliary cable or cables having a combined tearing strength that is smaller than a tearing strength of the hoisting cable.

6. The device claimed in claim 5, further comprising:
   a wheel retainer for supporting a spare tire from below, said wheel retainer being located above said cylinder; and
   a compression spring having a lower end that rests on said lower ferrule via a flange and an upper end on which said retainer rests.

7. The device claimed in claim 5, further comprising:
   a wheel retainer for supporting a spare tire from below, said retainer being located above said cylinder and being provided with an opening larger than the diameter of said cylinder; and
   a compression spring having a lower end resting on said lower ferrule and an upper end on which said retainer rests.

* * * * *